J. LEDWINKA.
PRESSED STEEL WHEEL.
APPLICATION FILED OCT. 9, 1917.
1,371,382.
Patented Mar. 15, 1921.
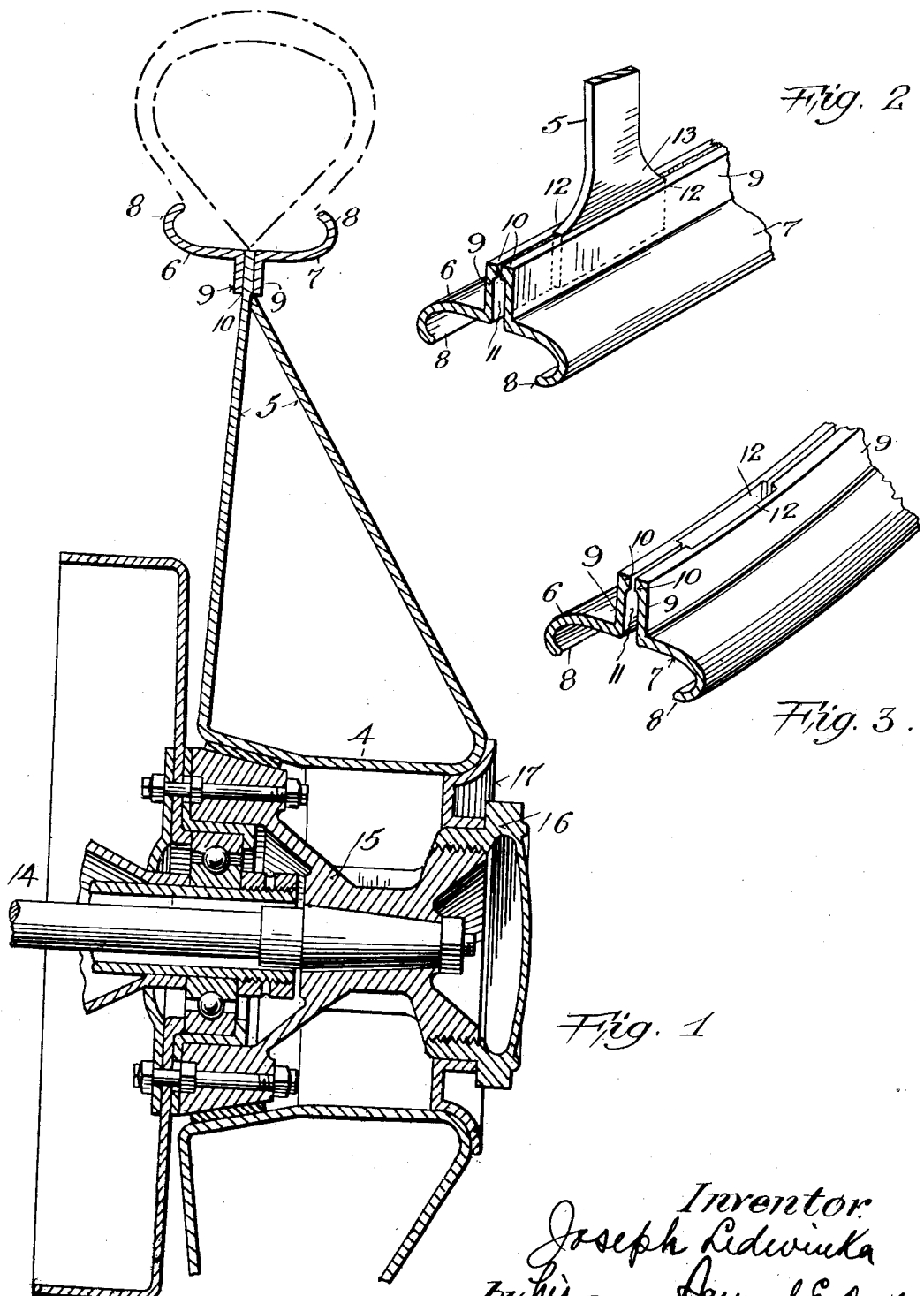

UNITED STATES PATENT OFFICE.

JOSEPH LEDWINKA, OF PHILADELPHIA, PENNSYLVANIA, ASSIGNOR, BY MESNE ASSIGNMENTS, TO BUDD WHEEL CORPORATION, OF PHILADELPHIA, PENNSYLVANIA, A CORPORATION OF VIRGINIA.

PRESSED-STEEL WHEEL.

1,371,382.

Specification of Letters Patent.   Patented Mar. 15, 1921.

Original application filed February 21, 1917, Serial No. 150,084. Divided and this application filed October 9, 1917. Serial No. 195,513.

*To all whom it may concern:*

Be it known that I, JOSEPH LEDWINKA, a citizen of the United States, residing at Philadelphia, in the county of Philadelphia, State of Pennsylvania, have made a certain new and useful Invention in Pressed-Steel Wheels, of which the following is a specification.

This invention relates to pressed steel wheels.

The object of the invention is to provide a pressed steel wheel structure, which is simple, and economical to manufacture, strong, durable, and efficient in operation and use.

Other objects of the invention will appear more fully hereinafter.

The invention consists substantially in the construction, combination, location, and relative arrangement of parts, all as will be more fully hereinafter set forth, as shown in the accompanying drawing and finally pointed out in the appended claims.

Referring to the drawing:

Figure 1 is a view in central section of a pressed steel wheel embodying my invention.

Fig. 2 is a detached detail broken view showing the application of the pressed steel spokes to the rim.

Fig. 3 is a similar view of a tire rim constructed in accordance with my invention.

The same part is designated by the same reference numeral wherever it occurs.

In carrying out my invention I form a pressed steel wheel with a central tubular sleeve portion 4 having integral spokes 5 at the respective ends thereof which are bent outwardly at the ends of the tubular sleeve portion, and are suitably connected to a tire rim at their outer free ends to form the complete wheel structure. The tire rim is formed of complementary portions in the form of rings 6, 7, stamped out of sheet steel, each having a tire engaging flange 8 along one edge, and a radial flange 9 at the other edge. The radial flanges at their outer extremities are provided with oppositely disposed shoulders or projections 10, which, when brought together, form an offset or space 11 between the opposed faces of the flanges 9. In practice the free ends of the spokes 5 are passed into the space 11 between the rim portions 6, 7, and are secured therein by welding, or otherwise, preferably by welding. In practice I prefer to notch out the opposed surfaces of the rim flanges 9, or rather the enlarged shoulder portions 10 as indicated at 12 at the points where the spoke ends enter therebetween, but not to a sufficient extent to permit the opposed side surfaces of the flanges 9 to come into contact with each other when the spoke ends occupy the notched recesses 12. This enables me to secure a most expeditious, effective, and economical welding together of these parts under the influence of heat and pressure, inasmuch as welding current is required to pass through only those portions of the flanges 9 which contact with the spoke ends which are to be welded thereto, and consequently I am enabled to produce an exceedingly strong and durable structure, and at the same time an inexpensive structure. In practice I prefer to enlarge the outer free ends of the spokes 5 as indicated at 13 in order to secure additional strength and bracing effect.

A stamped wheel having the tire structure above described may be mounted upon any suitable axle hub and detachably retained in place in any suitable or convenient manner. As illustrative of the principles involved I have shown an axle 14 upon which a receiving hub 15 is mounted, which receives the tubular wheel sleeve 4, the wheel being detachably held in place by a clamp nut 16 threaded upon the outer end of the axle hub and carrying a retaining ring 17 which engages the wheel sleeve 4 in its outer end and forces and detachably retains the wheel upon the axle hub.

The subject matter of this application is divided from my application, Serial No. 150,084, filed February 21, 1917.

Having now set forth and described the object and nature of my invention, and a construction embodying the principles thereof, what I claim as new and useful, and of my own invention, and desire to secure by Letters Patent, is,—

1. A pressed steel wheel having a hub sleeve formed with integral spoke portions at its ends, and a rim composed of complementary sections each having a radial flange and a tire engaging flange, the radial flanges having offset shoulders and outer opposing edges to offset the surfaces of the flange portions from each other, the outer or free ends of the spoke portions being received in the offset spaces between the rim flanges and secured thereto.

2. A pressed steel wheel having a hub sleeve formed with integral spokes at its ends, and a rim composed of complementary sections, each having a radial flange and a tire engaging flange, the radial flanges having lateral shoulders at their outer edges on their opposed surfaces, said shoulders having notches or seats formed therein, the outer ends of the spokes being received in said notches or seats and secured therein.

3. A pressed steel wheel, comprising a hub shell provided with a plurality of flat spokes formed integral therewith at each end thereof, and a pair of complementary rim sections connected to the end of said spokes, the ends of said spokes being interposed between said sections and spacing them from each other.

4. A pressed steel wheel, comprising a hub shell, provided with a plurality of flat spokes formed integral therewith at each end thereof, and a pair of complementary rim sections connected to the ends of said spokes, the ends of said spokes being interposed between said sections and spacing them from each other and being welded to said rim sections.

5. A pressed steel wheel, comprising a hub shell provided with a plurality of flat spokes formed integral therewith at each end thereof, and a pair of complementary rim sections connected to the ends of said spokes, the said rim sections being provided with inwardly extending annular flanges, the ends of said spokes being interposed between said flanges and spacing the rim sections from each other.

6. A pressed steel wheel, comprising a hub shell provided with a plurality of flat spokes formed integral therewith at each end thereof, and a pair of complementary rim sections connected to the ends of said spokes, the said rim sections being provided with an inwardly extending annular flange, having a plurality of spaced notches therein, the ends of said spokes being disposed in said notches and interposed between said flanges and spacing the rim sections from each other.

7. A pressed steel wheel, comprising a hub shell provided with a plurality of flat spokes formed integral therewith at each end thereof, and a pair of complementary rim sections connected to the ends of said spokes, each rim section having an inwardly extending annular flange with a plurality of spaced notches therein, the ends of said spokes being interposed between said flanges and disposed in said notches, and spacing the rim sections from each other, spokes from opposite ends of said hub shell being alternately connected to said rim sections.

In testimony whereof I have hereunto set my hand on this 1st day of October A. D. 1917.

JOSEPH LEDWINKA.